United States Patent
Lee et al.

(10) Patent No.: US 7,936,141 B2
(45) Date of Patent: May 3, 2011

(54) MOTOR DRIVER SYSTEM AND METHOD OF PROTECTING MOTOR DRIVER

(75) Inventors: Kyung Hoon Lee, Seoul (KR); June Hee Won, Seoul (KR); Gil Su Lee, Seoul (KR); Jun Ho Ahn, Seoul (KR); Jae Yoon Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 559 days.

(21) Appl. No.: 11/945,822

(22) Filed: Nov. 27, 2007

(65) Prior Publication Data
US 2009/0184673 A1 Jul. 23, 2009

(30) Foreign Application Priority Data
May 29, 2007 (KR) .................. 10-2007-0052250

(51) Int. Cl.
*H02H 7/08* (2006.01)
(52) U.S. Cl. ......... 318/473; 318/476; 318/471; 318/445
(58) Field of Classification Search .................. 318/473, 318/476, 471, 445
See application file for complete search history.

(56) References Cited

U.S. PATENT DOCUMENTS

| | | | | |
|---|---|---|---|---|
| 4,683,515 A | * | 7/1987 | Beihoff et al. | 361/106 |
| 5,057,759 A | * | 10/1991 | Ueda et al. | 318/616 |
| 6,465,978 B2 | * | 10/2002 | Takahashi | 318/432 |
| 6,603,110 B2 | * | 8/2003 | Hayami et al. | 250/214 R |
| 6,707,406 B2 | * | 3/2004 | Kohara et al. | 341/141 |
| 6,724,168 B2 | | 4/2004 | Cheong et al. | |
| 7,071,649 B2 | * | 7/2006 | Shafer et al. | 318/783 |
| 7,356,441 B2 | * | 4/2008 | Kerkman et al. | 702/182 |

OTHER PUBLICATIONS

Position Sensorless Control of Transverse-Laminated Synchronous Reluctance Motors, Capecchi et al., pp. 1766-1773, IEEE , Rome, Italy, Oct. 2000.

* cited by examiner

*Primary Examiner* — Walter Benson
*Assistant Examiner* — David S Luo
(74) *Attorney, Agent, or Firm* — Birch, Stewart, Kolasch & Birch, LLP

(57) ABSTRACT

A motor driver system includes an excess current sensing device configured to compensate a sensing value depending on a temperature of a motor, and to output the compensated sensing value, the sensing value being obtained from a current value associated with the motor; and a controller configured to stop the motor when the compensated sensing value exceeds a preset excess value.

24 Claims, 10 Drawing Sheets

MOTOR DRIVER SYSTEM AND METHOD OF PROTECTING MOTOR DRIVER

This Nonprovisional Application claims priority under 35 U.S.C. §119(a) on Patent Application No. 10-2007-0052250 filed in Korea on May 29, 2007, the entire contents of which are hereby incorporated by reference.

BACKGROUND OF THE INVENTION

1. Field of the Invention

The present invention relates, in general, to a motor driver system and a method of protecting a motor driver, in which a motor can be protected from burning due to an excess current or a noise current. More particularly, the present invention relates to a motor driver system that can protect a motor, an inverter, etc. by determining an excess current state depending on temperature and the like even if a sensed current value is the same.

2. Discussion of Related Art

One of causes to burn the motor and the motor driver is an excess current induced to the motor. A conventional excess current protection system employs a method of sensing current induced to the motor and stopping the driving of the motor or turning off the motor when an excess current sensing value exceeds a fixed excess current level value.

However, although a sensed current value may not exceed an excess current level value, devices can still reach an excess current state due to overheating, temperature rise, component aging, and so on. In the related all, since an excess current level value is fixed, the excess current state of a motor, a driver and so forth may not be sensed even when the motor or the driver is in the excess current state. Consequently, the inverter and the motor could be burnt.

SUMMARY OF THE INVENTION

Accordingly, an embodiment of the present invention is directed to provide a motor driver system and a method of protecting a motor driver, in which burning of a motor, an inverter and so on can be prevented by determining an excess current without being influenced by temperature rise or a noise current.

In accordance with an embodiment of the present invention, there is provided a motor driver system, including an excess current sensing device configured to compensate a sensing value depending on a temperature of a motor, and to output the compensated sensing value, the sensing value being obtained from a current value associated with the motor; and a controller configured to stop the motor when the compensated sensing value exceeds a preset excess value.

In accordance with another embodiment of the present invention, there is provided a motor driver system, including an inverter configured to output an excess current sensing signal when a sensing value exceeds a preset excess value; an amplifier configured to amplify a sensing value depending on a temperature of a motor, the sensing value being obtained from a current value input to the inverter, and outputs an amplified sensing value; and a controller configured to stop the motor when the amplified sensing signal is received.

In accordance with still another embodiment of the present invention, there is provided a method of protecting a motor driver, including obtaining a sensing value from a current value associated with a motor; compensating the sensing value according to a temperature of the motor to output the compensated sensing value; and stopping the motor when the compensated sensing value exceeds a preset excess value.

DETAILED DESCRIPTION OF THE ILLUSTRATED EMBODIMENTS

The present invention will now be described in detail in connection with specific embodiments with reference to the accompanying drawings.

Figure 1:
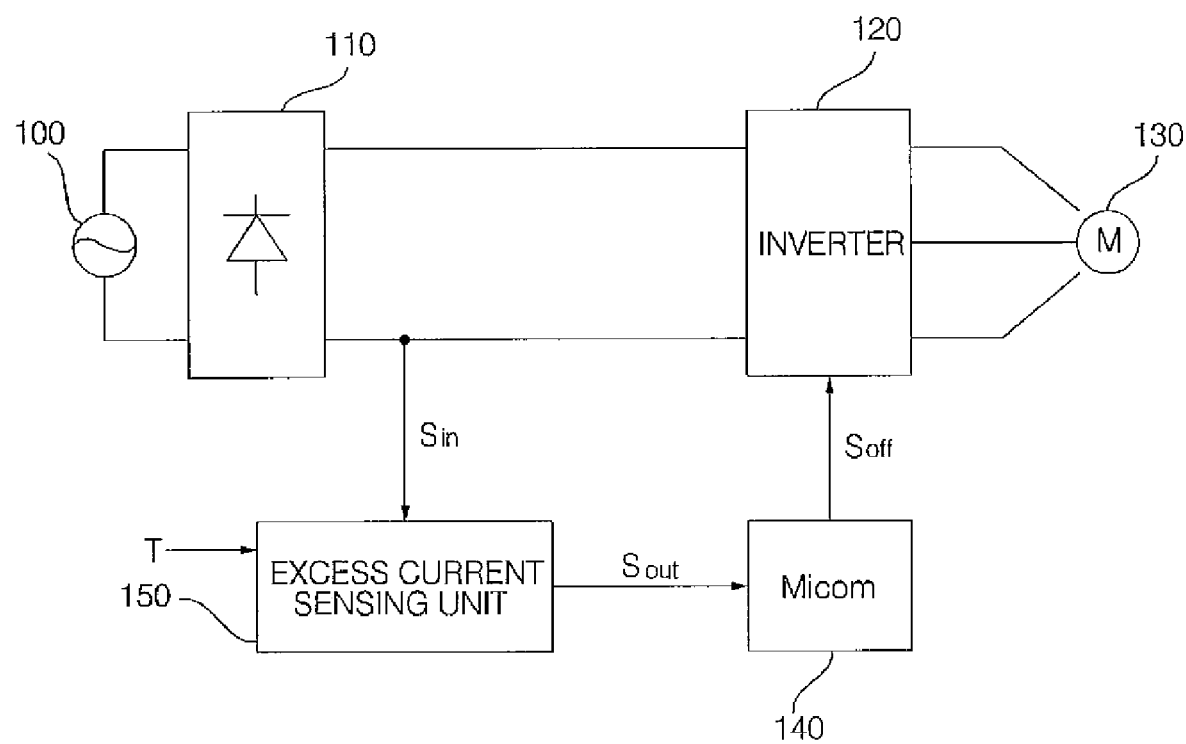
FIG. 1 is a block diagram of a motor driver system in accordance with an embodiment of the present invention.

FIG. 1 is a block diagram of a motor driver system in accordance with a first embodiment of the present invention. The motor driver system includes an AC power source 100, a rectifier 110, an inverter 120, a motor 130, a micom 140, and an excess current sensing unit 150.

The AC power source 100 supplies power to the load, the controller such as a micom 140 and peripheral circuits of the micom 140 necessary to drive the motor 130. The rectifier 110 converts an AC voltage, from the AC power source 100, into a DC power by using a diode, a condenser, etc. and inputs the converted DC power to the inverter 120.

The inverter 120 converts the received DC power into an AC power having an adequate frequency and amplitude in response to a driving signal of the micom 140.

The micom 140 is an abbreviation of a microcomputer, and is an ultra small-sized computer mounted on a board in which a storage device, an interface circuit with peripheral devices, etc. are attached to a microprocessor in which the operational processor of a computer is comprised of one or several Large-Scale Integration (LSI) circuits. The micom 140 sends the driving signal to the inverter 120 in order to control the power applied from the inverter 120 to the motor 130. Furthermore, the micom 140 protects the motor driver system from an excess current by shutting off the power when an excess current sensing signal $F_0$ is received.

The excess current sensing unit 150 determines whether an excess current flows through the motor driver system. In the illustrated embodiment as shown in FIG. 1, the excess current sensing unit 150 calculates a sensing input value $S_{in}$, which is proportional to the current input to or output from either of the inverter 120 and the motor 130, and outputs the value as a sensing value $S_{out}$, which is proportional to a temperature T of the motor driver system.

Determining whether the sensing value exceeds an excess value can be performed in any one of the excess current sensing unit 150, the micom 140, the inverter 120, and an excess current detection unit (not shown). In the present embodiment, the micom 140 determines whether the sensing value calculated by the excess current sensing unit 150 exceeds the excess value in order to determine whether the motor driver system is in the excess current status. If it is determined that the sensing value exceeds the excess value, the micom 140 sends an off signal $S_{off}$ to the inverter 120 and stops the motor 130, thus protecting the motor 130, the inverter 120, etc.

Figure 2:
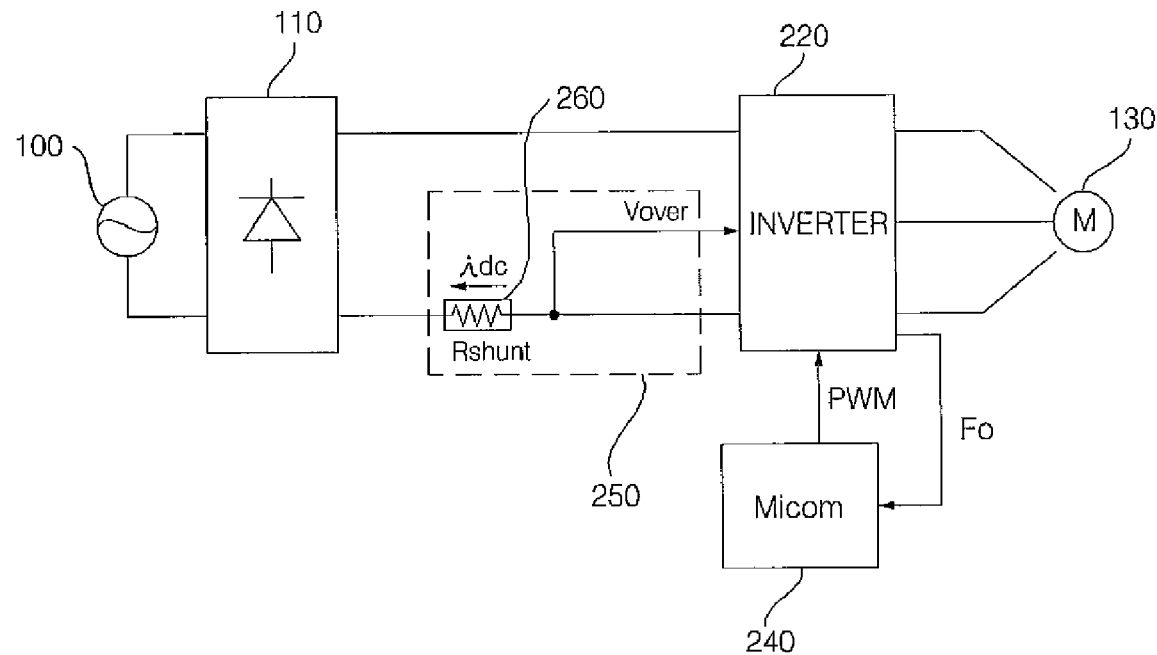
FIG. 2 is a block diagram of a motor driver system including a general excess current protection device.

FIG. 2 is a block diagram of a motor driver system including a general excess current protection device. The motor driver system includes an AC power source 100, a rectifier 110, an inverter 220, a motor 130, a micom 240, and an excess current sensing unit 250.

The excess current sensing unit 250 includes a shunt resistor 260. The shunt resistor 260 has a low value and is connected to a lead through which a DC current $i_{dc}$ flows. The excess current sensing unit 250 measures a voltage $V_{over}$ across the shunt resistor 260 and sends the measured voltage $V_{over}$ to the inverter 220. The inverter 220 compares the voltage $V_{over}$ with a preset excess value, and sends an excess current sensing signal $F_0$ to the micom 240 when the voltage $V_{over}$ exceeds the excess value. If the excess current sensing signal $F_0$ is received from the inverter 220, the micom 240 stops generating a PAM signal applied to the inverter 220, and stop the motor 130.

Figure 3:
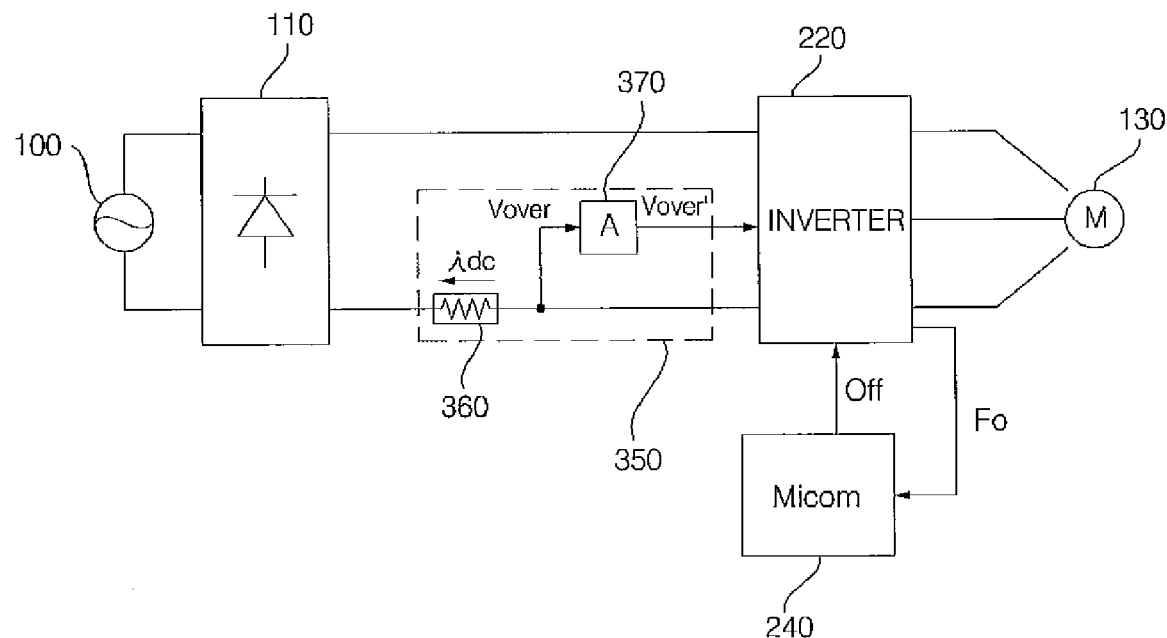
FIG. 3 is a block diagram of a motor driver system in accordance with an embodiment of the present invention.

FIG. 3 is a block diagram of a motor driver system in accordance with a second embodiment of the present invention. The motor driver system includes an AC power source 100, a rectifier 110, an inverter 220, a motor 130, a micom 240, and an excess current sensing unit 350. The motor driver system is described below with reference to FIGS. 1 and 2.

The excess current sensing unit 350 measures a voltage across the shunt resistor 360, which has a low value and is connected to a lead through which a DC current $i_{dc}$ flows, and calculates the sensing input value $V_{over}$. As a current is proportion to a voltage according to Ohm's law, the voltage across the shunt resistor 360 can become a basis for determining whether the current input to the inverter is an excess current.

The excess current sensing unit 350 compensates the value $V_{over}$, that is, the calculated sensing input value to a compensated sensing value $V_{over}'$ depending on a temperature T, and outputs the resulting value $V_{over}'$. In other words, the excess current sensing unit 350 amplifies the received voltage $V_{over}$ in proportion to the temperature T through an amplification unit 370. The amplified voltage $V_{over}'$ is the compensated sensing value.

The inverter 220 compares the compensated sensing value with a preset excess value. If the compensated current sensing value exceeds the preset excess value, the inverter 220 sends an excess current sensing signal $F_0$ to the micom 240. If the excess current sensing signal $F_0$ is received, the micom 240 stops the motor 130.

The amplification unit 370 outputs a received value in proportion to the amplification factor/gain. In the present embodiment, the amplification factor has a value proportional to the temperature T of the motor driver system. That is, the amplification unit 370 receives the voltage $V_{over}$ across the shunt resistor, and outputs the voltage $V_{over}'$ proportional to the amplification factor depending on the temperature.

When the temperature rises, the compensated sensing value $V_{over}'$ is obtained by amplifying the voltage $V_{over}$ through the amplification unit 370 in proportion to the temperature T. Accordingly, the inverter 220 outputs the excess current sensing signal $F_0$ even when a sensed current value is lower than an excess value set for a normal temperature. Thus, burning of the inverter 220, the motor 130, etc. due to temperature rise can be prevented.

The excess current sensing unit 350 includes an amplifier with an amplification factor of a ratio of a gain control resistor $R_f$ and a temperature variable resistor whose resistance value varies depending on a temperature. The temperature variable resistor can include a thermistor, a PTC (positive temperature coefficient) element, an NTC (negative temperature coefficient) element, and so on.

Figure 4:
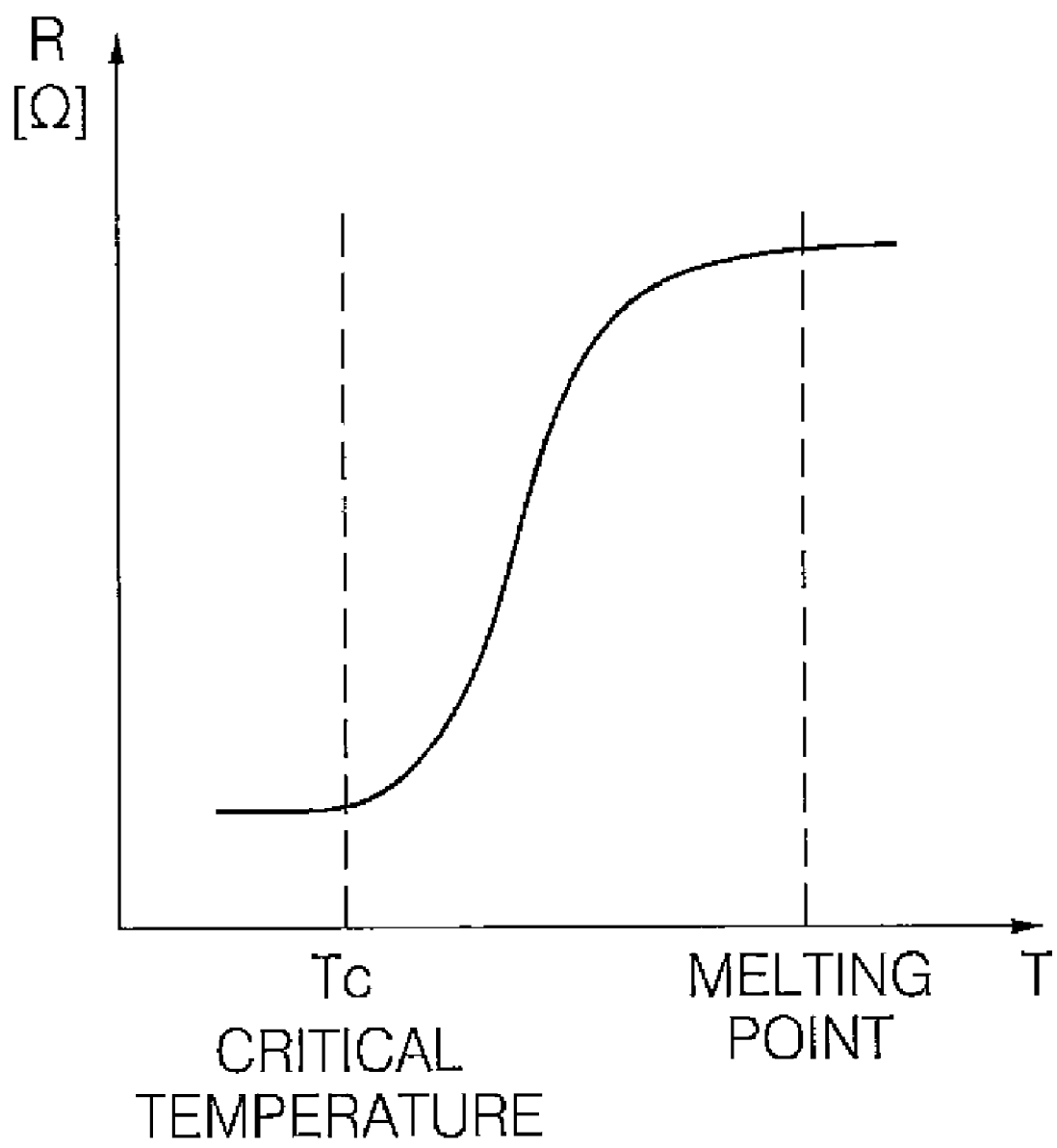
FIG. 4 is a characteristic curve illustrating the relationship between electrical resistance and temperature of a Positive Temperature Coefficient (PTC) element.
Figure 5:
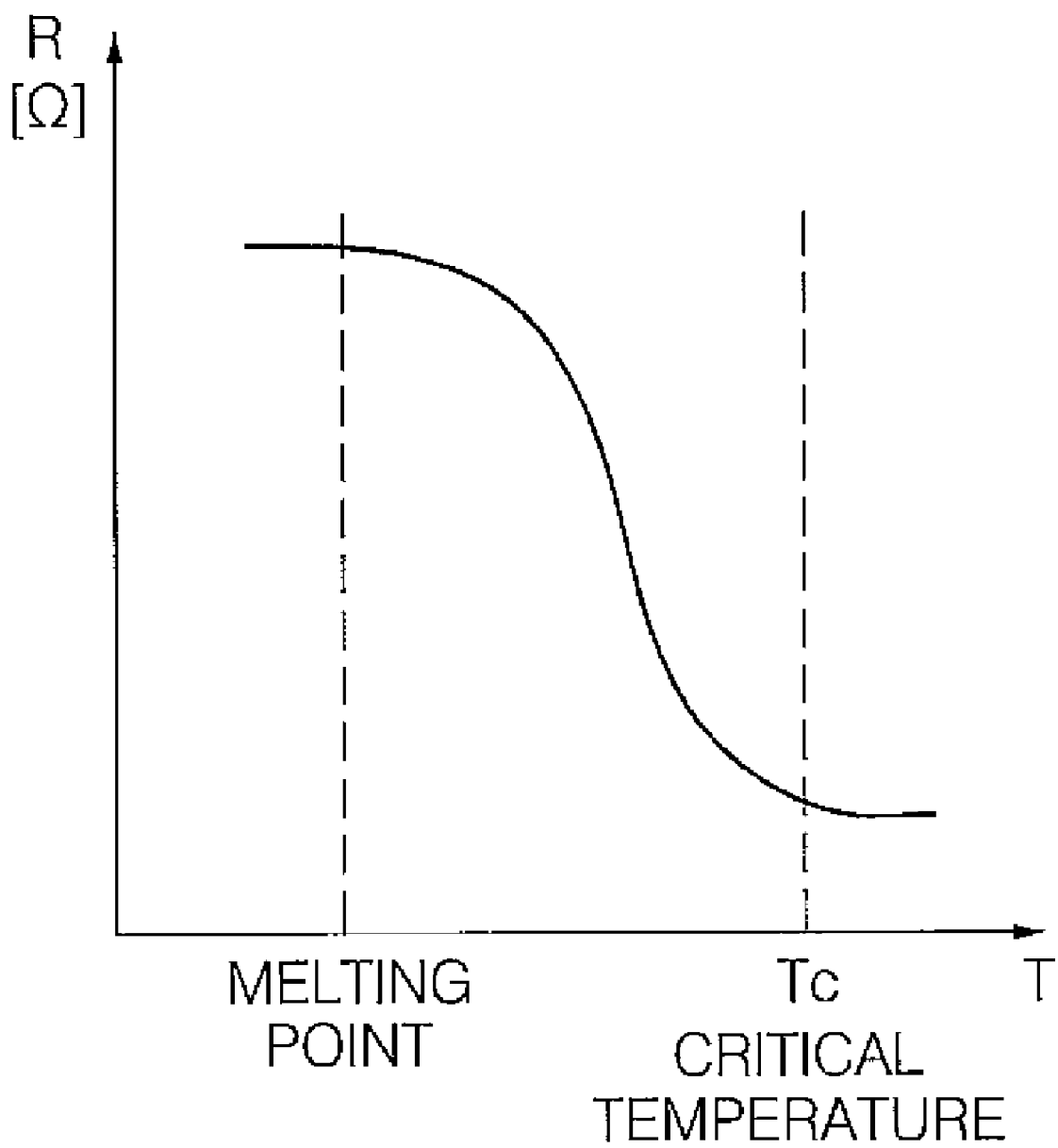
FIG. 5 is a characteristic curve illustrating the relationship between electrical resistance and temperature of a Negative Temperature Coefficient (NTC) element.

FIGS. 4 and 5 are characteristic curves illustrating the relationship between the electrical resistance and the temperature of PTC and NTC elements. The PTC element is made of $BaTiO_3$-based ceramics. The ceramics heating element is a semi-conductive ceramics element with a direct proportion temperature coefficient. The PTC element has a constant electrical resistance below a critical temperature $T_c$, but has a significantly increasing electrical resistance as the temperature rises when the temperature rises from the critical temperature $T_c$ to a melting point. This is referred to as a PTC effect. This temperature-resistance characteristic graph is shown in FIG. 4.

On the other hand, the resistance of the NTC element decreases as the temperature rises. This temperature-resistance characteristic graph is shown in FIG. 5.

The thermistor is a kind of semiconductor in which some of the materials such as cobalt, copper, manganese, iron, nickel, and titanium, are mixed and sintered so that it has an adequate resistance and temperature coefficient. The thermistor is an element for an electronic circuit in which the conductivity is sensitive to variation in a surrounding temperature. The thermistor can include a PTC element, a NTC element, and/or a Critical Temperature Resistor (CTR) element whose resistance value abruptly changes at a specific temperature, and so on.

FIGS. 6 to 9 are internal circuit diagrams of the amplification unit 370 of the excess current sensing unit 350 shown in FIG. 3. The amplification unit 370 includes an amplifier 675, a temperature variable resistor, a gain control resistor $R_f$ and a noise elimination resistor $R_n$.

The amplification unit 350 amplifies the sensing input value $V_{over}$ to be the sensing value $V_{over}'$ on which a temperature characteristic has been reflected.

Figure 6:
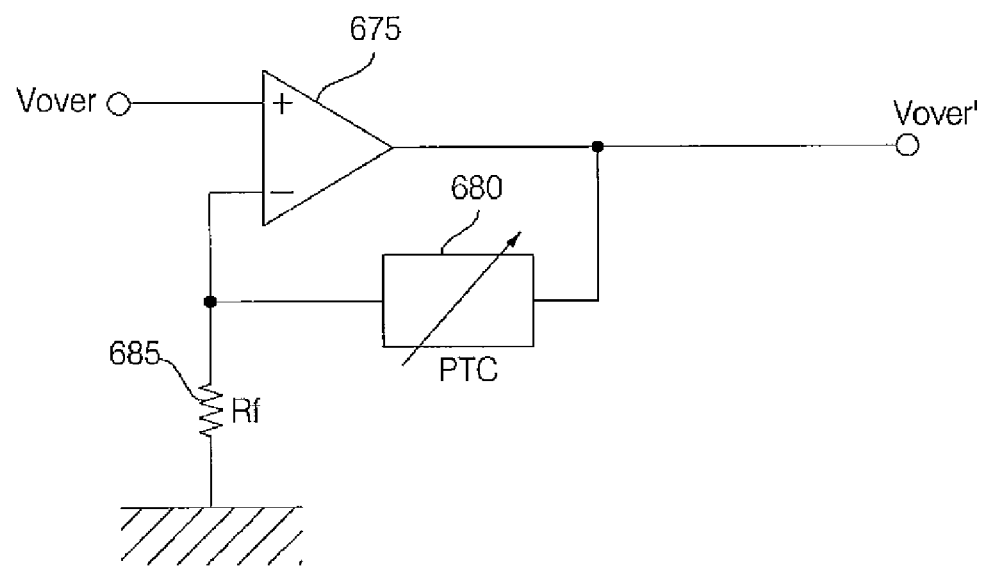
FIG. 6 is a circuit diagram of an input device unit employing a PTC element and an operational amplifier in accordance with an embodiment of the present invention.

FIG. 6 is a circuit diagram of the amplification unit of the motor driver system in accordance with a third embodiment of the present invention. In particular, the amplification unit amplifies the input signal $V_{over}$ and outputs the output signal $V_{over}'$, by employing an operational amplifier 675, a PTC element 680, and a gain control resistor 685. The amplification unit of FIG. 6 is described below with reference to FIG. 3.

The excess current sensing value $V_{over}$ is input to a non-inverting terminal (+) of the operational amplifier 675. An inverting terminal (−) of the operational amplifier 675 is connected to the PTC element 680 that is connected to an output terminal of the operational amplifier 675 and is also connected to the gain control resistor 685 connected to the ground. The amplification factor/gain G by the non-inverter amplifier employing the operational amplifier 675 is expressed in the following equation 1.

$$G = \frac{V_{over}}{V_{over'}} = \left(1 + \frac{R_{PTC}}{R_f}\right) \quad \text{[Equation 1]}$$

As shown in equation 1, when the resistance value $R_{PTC}$ of the PTC element increases as temperature rises, the amplification factor G increases accordingly. Thus, the amplified sensing value $V_{over'}$ reflects the temperature characteristic of the motor.

In the event that a circuit is constructed of a PTC element, an NTC element or the like, the circuit can react to such temperature rise directly and rapidly by attaching the PTC element, etc. to a heat-dissipation plate of an inverter, a casing of a motor, and so on.

Figure 7:
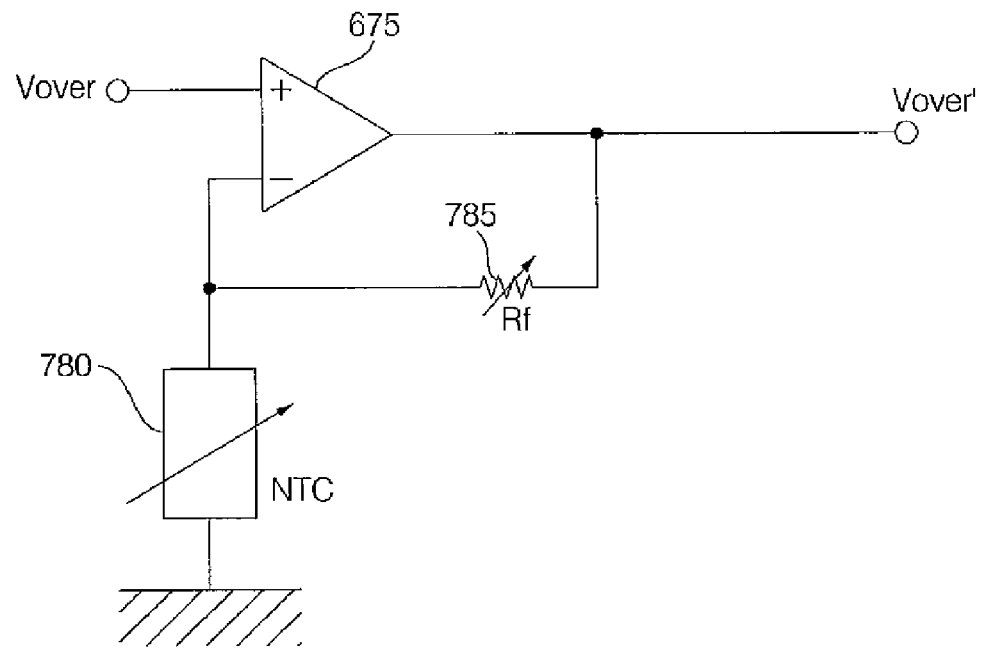
FIG. 7 is a circuit diagram of an input device unit employing a NTC element and an operational amplifier in accordance with an embodiment of the present invention.

FIG. 7 is a circuit diagram of the amplification unit of the motor driver system in accordance with a fourth embodiment of the present invention. The amplification unit includes an operational amplifier 675, a NTC element 780, and a gain control resistor 785. In FIG. 7, the NTC element is used instead of the PTC element in FIG. 6. In order to increase the amplification factor as temperature rises, the location of each resistor is changed. The amplification unit of FIG. 7 is described below with reference to FIG. 3.

The excess current sensing value $V_{over}$ is input to a non-inverting terminal (+) of the operational amplifier 675. A inverting terminal (−) of the operational amplifier 675 is connected to the NTC element 780 that is connected to an output terminal of the operational amplifier 675 and is also connected to the gain control resistor 785 connected in series to the ground. The amplification factor/gain G by the non-inverter amplifier is expressed in the following equation 2.

$$G = \frac{V_{over}}{V_{over'}} = \left(1 + \frac{R_f}{R_{NTC}}\right) \quad \text{[Equation 2]}$$

As the resistance value $R_{NTC}$ of the NTC element decreases as temperature rises, the amplification factor G increases accordingly. Thus, the amplification factor G increases, and the amplified sensing value $V_{over'}$ reflects the temperature characteristic of the motor.

In this circuit diagram, the gain control resistor 785, $R_f$ can include a variable resistor that can select a specific resistance value, if needed. The variable resistor can be used, for example, when it is necessary to adjust the operation status due to a component error in an electronic circuit, and includes a potentiometer which has a user-adjustable resistance. The amplification factor G can be adjusted at a specific temperature by using the variable resistor. This can also be applied to the gain control resistor $R_f$, 685 of FIG. 6. As can be seen from Equations 1 and 2, the PTC element or the NTC element has a specific, resistance value at a specific temperature. Thus, the amplification factor G can also be constant. In other words, in the event that it is necessary to adjust the amplification factor G due to a change of the whole system (for example, component aging, replacement, etc.) irrespective of the temperature, this requirement can be fulfilled by controlling the resistance value of the gain control resistor $R_f$.

Figure 8:
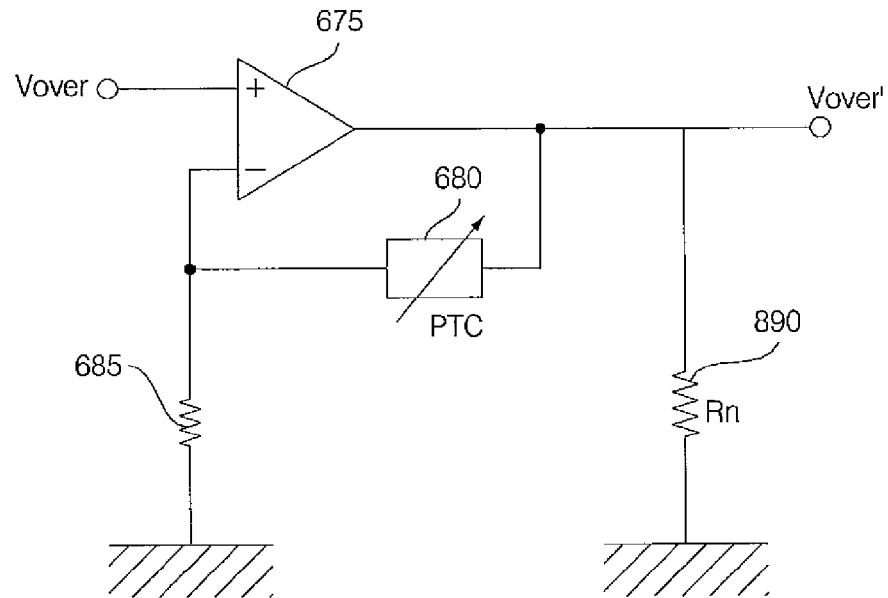
FIG. 8 is a circuit diagram illustrating an embodiment regarding noise elimination in accordance with an embodiment of the present invention.
Figure 9:
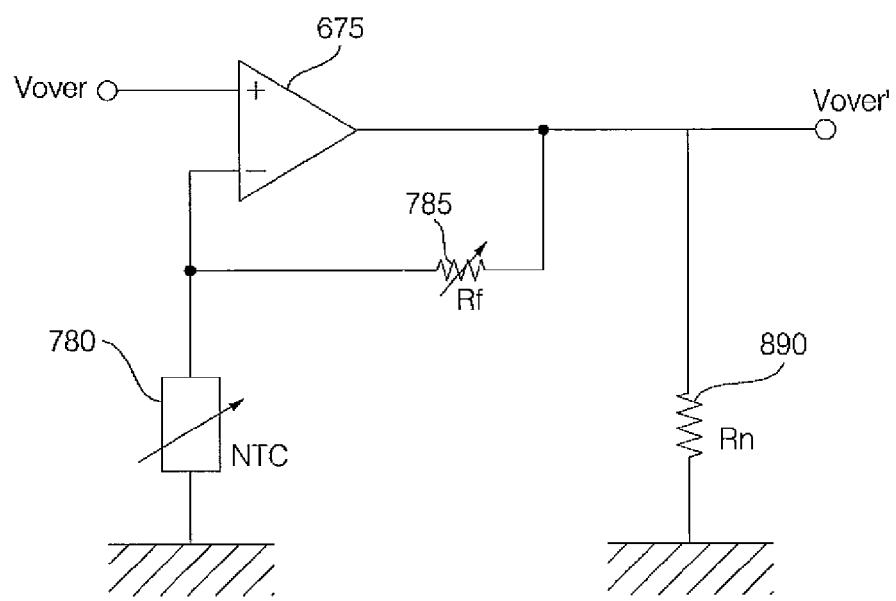
FIG. 9 is a circuit diagram illustrating an embodiment regarding noise elimination related to FIG. 7.

FIGS. 8 and 9 are block diagrams of the motor driver system in accordance with a fifth embodiment of the present invention. In particular, the motor driver systems of FIGS. 8 and 9 include noise elimination resistors $R_n$, 890 and 990, respectively, which are connected to the output terminals of the operational amplifiers 675 of FIGS. 6 and 7, respectively. The amplification units of FIGS. 8 and 9 are described below with reference to FIGS. 3, 6, and 7.

A noise current (for example, a peak current due to switching of the inverter 220 in response to the PWM signal of the micom 240) can be induced to the amplification unit 370. This noise current does not generate burning in the motor system, but causes a high voltage at the output terminal of the operational amplifier 675, so that the excess current sensing signal $F_O$ can be generated in the inverter 220. In particular, in the event that the temperature variable resistor or the gain control resistance $R_f$ has a high resistance value, this noise current may cause malfunction.

In the illustrated embodiments as shown in FIGS. 8 and 9, the noise elimination resistor $R_n$ is connected between the output terminal of the operational amplifier 675 and the ground in order to minimize the effect of a noise current, so that the noise current can flow to the ground. In this case, the noise elimination resistor $R_n$ has a value lower than that of the temperature variable resistor and the gain control resistor $R_f$ so that the noise current can flow through the noise elimination resistor $R_n$. Accordingly, a noise current can be eliminated economically and effectively by using a cheap resistor. FIG. 8 is a circuit diagram illustrating a case where the gain control resistor 685, $R_f$ has a fixed resistance value, and FIG. 9 is a circuit diagram illustrating a case where the gain control resistor 785, $R_f$ has a variable resistance value.

Figure 10:
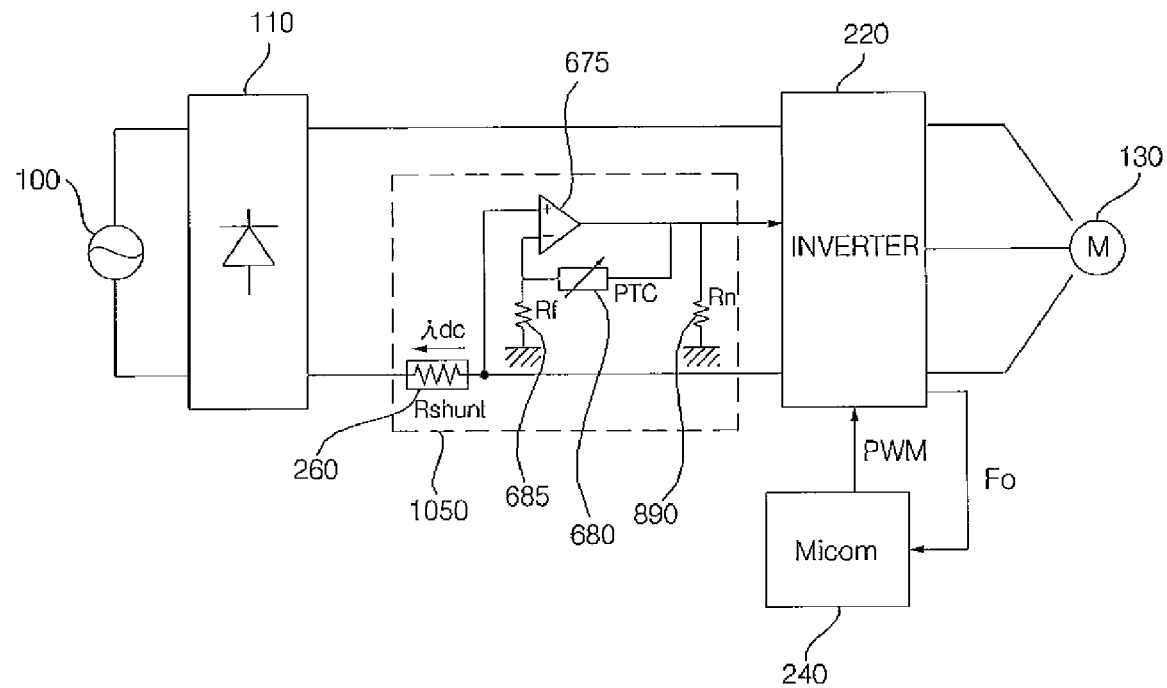
FIG. 10 is a block diagram of an overall excess protection system employing the PTC element and the operational amplifier in accordance with an embodiment of the present invention.

FIG. 10 is a block diagram of an embodiment in which the excess current sensing unit of FIG. 8 is applied to the motor driver system. The present embodiment is described below with reference to FIGS. 3 and 8.

The AC voltage from the AC power supply 100 is converted to a DC voltage through the rectifier 110 and is then input to the inverter 220. The inverter 220 drives the motor 130 in response to a driving signal of the micom 240. An excess current sensing unit 1050 obtains the voltage, which is applied to the shunt resistor 260 connected to the lead through which the DC flows, as a sensing input value.

The excess current sensing unit 1050 sends the compensated sensing value, that is, a value on which a temperature characteristic has been reflected, to the inverter 220 by employing the operational amplifier 675, the PTC element 680, and the gain control resistor 685. That is, when a temperature rises due to the operation of the motor 130, the inverter 220 may output the excess current sensing signal $F_O$ even when a sensed current value is lower than an excess value set for a normal temperature. If the excess current sensing signal is generated, the driving of the motor 130 stops, so that burning of the motor 130, the inverter 220, etc. due to high temperature, an excess current and so on can be prevented.

A noise elimination resistor 890 minimizes the effect of a noise current, such as a peak current caused by switching, etc. In other words, transfer of a high voltage to the inverter 220 due to a noise current can be prevented and unnecessary malfunction, such as motor stop, can be prevented accordingly.

Figure 11:
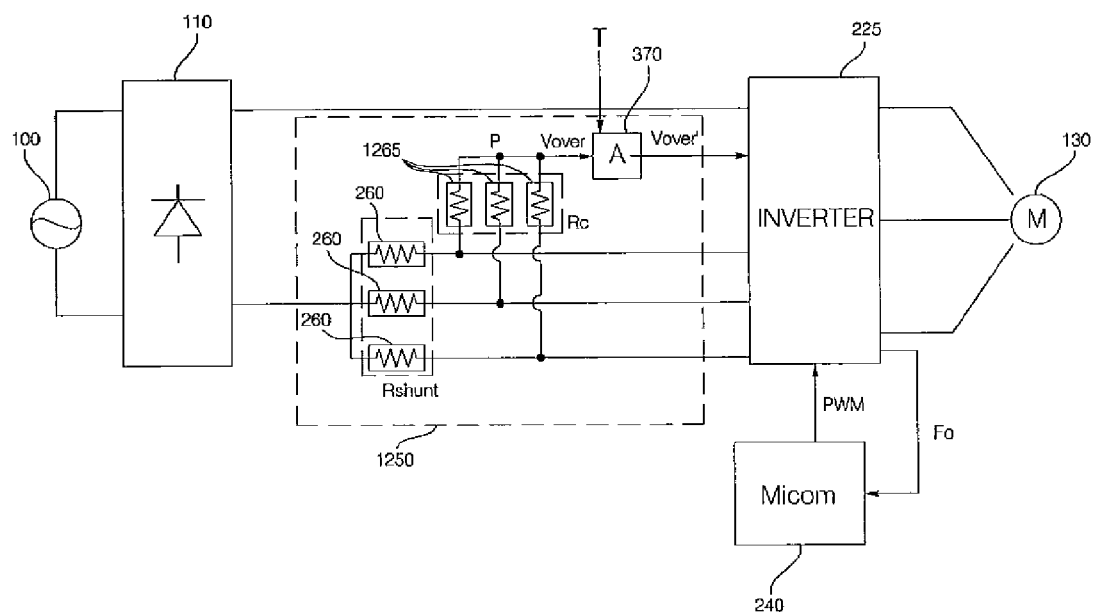
FIG. 11 is a block diagram in which voltage is sensed from DC flowing on each phase of an inverter and then applied to the excess current sensing unit in accordance with an embodiment of the present invention.
Figure 12:
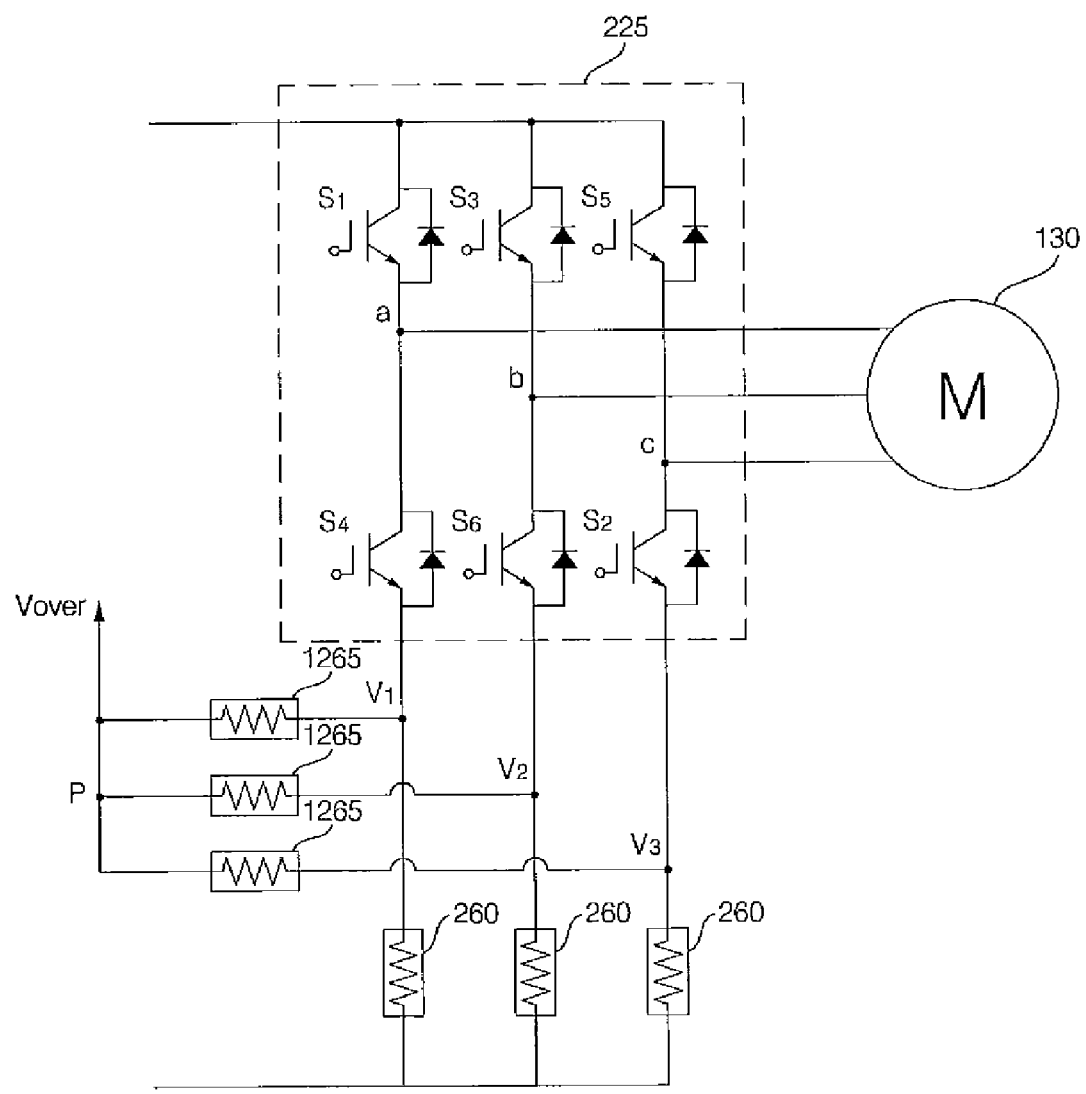
FIG. 12 is a detailed block diagram illustrating a method of sensing voltage from each phase of the inverter shown in FIG. 11.

FIG. 11 is a block diagram of a motor driver system in accordance with a sixth embodiment of the present invention. In FIG. 11, a voltage is sensed from a DC current ($i_{dc}$) flowing through each phase of the inverter 225 and then applied to an excess current sensing unit 1250. FIG. 12 is a circuit diagram of a circuit for driving a switch element of an inverter 225 of FIG. 11.

In the present embodiment, an inverter 225 includes a 3-phase inverter. Bidirectional power switches S1, S2, S3, S4, S5, and S6 have an anti-parallel construction of an active power semiconductor device and a diode. The inverter 225 applies a three-phase power to the motor 130 through a switching operation in response to the driving signal of the micom 240.

An excess current sensing unit 1250 connects the shunt resistor 260 to each phase of the inverter 225 and senses voltage applied to each shunt resistor 260. Respective sensed voltages $V_1$, $V_2$, and $V_3$ are summed through the respective addition resistors 1265 and then sent to the amplification unit 370. When the resistance values of the respective addition resistors 1265 are the same, the voltage $V_{over}$ at a point P becomes the sum of the voltages $V_1$, $V_2$, and $V_3$ according to Kirchhoff's Current Law (KCL).

In the present embodiment, since the excess current sensing unit 1250 senses the voltage of each phase of the inverter 225, the excess current flowing through any phase can be sensed easily.

Figure 13:
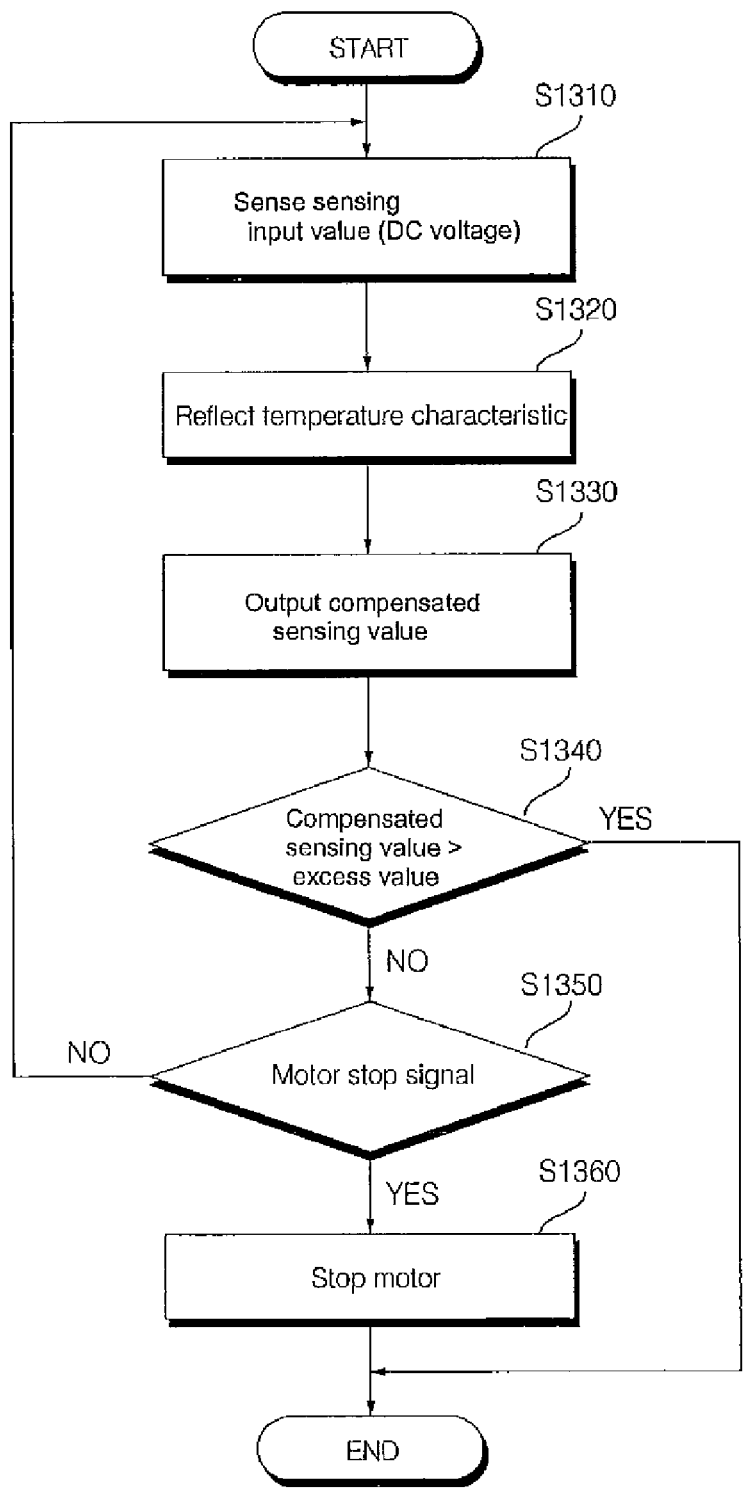
FIG. 13 is a flowchart illustrating a method of protecting a motor driver system from an excess current depending on, in particular, temperature rise in accordance with an embodiment of the present invention.

FIG. 13 is a flowchart illustrating a method of protecting a motor driver in accordance with a seventh embodiment of the present invention. In particular, a motor driver can be protected from an excess current depending on a temperature rise. The flowchart is described below with reference to FIG. 3.

The excess current sensing unit 350 senses the sensing input value depending on a DC current ($i_{dc}$) induced to the inverter 220 in step S1310, and compensates the excess current sensing input value $V_{over}$ to be the compensated sensing value $V_{over}'$ so that a temperature characteristic is reflected on the compensated sensing value $V_{over}'$ in step S1320. When the resistance is constant, whether the sensing input value is in an excess current state can be determined based on the amount of the voltage because the current and the voltage have a proportional relationship. In the present embodiment, the sensing input value is output as the DC voltage $V_{over}$ applied to the shunt resistor 260 in a state where the shunt resistor 260 having a low value is connected to the lead through which DC induced to the inverter 220 flows. If the temperature of the system rises, the temperature characteristic is reflected on the DC voltage $V_{over}'$ so that the amount of the voltage increases.

The excess current sensing unit 350 outputs the compensated voltage $V_{over}'$ on which the temperature characteristic has been reflected in step S1330.

The inverter 220 compares the compensated sensing value with an excess value in step S1340. If the compensated sensing value is higher than the excess value, the micom 240 stops the motor by a method of shutting off power applied to the motor or sending an off signal to the inverter 220 in step S1360. If the compensated sensing value is lower than the excess value, the micom 240 continues to sense the DC voltage of the motor driver system unless the motor stop signal is received in step S1350.

As described above, in accordance with the present invention, even when the same current is input to an inverter in different temperatures, the current is determined as an excess current state by compensating a sensing value according to the temperature. In particular, although an excess value is fixed, burning of a motor, an inverter, etc. due to temperature rise of a motor driver system can be prevented from an excess current.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A motor driver system comprising:
   an excess current sensing device configured to compensate a sensing value depending on a temperature of a motor, and to output the compensated sensing value, the sensing value being obtained from a current value associated with the motor; and
   a controller configured to stop the motor when the compensated sensing value exceeds a preset excess value,
   wherein the excess current sensing device comprises:
      a gain control resistor;
      a temperature variable resistor having a variable resistance value varying with the temperature of the motor; and
      an amplifier configured to amplify the sensing value and outputs the amplified sensing value.

2. The motor driver system of claim 1, further comprising an inverter, wherein the sensing value is obtained from the current value inputted into or outputted from either one of the inverter and the motor.

3. The motor driver system of claim 1, wherein the inverter transmits an excess current sensing signal to the controller when the compensated sensing value exceeds the preset excess value, and the controller stops the motor when the excess current sensing signal is received.

4. The motor driver system of claim 1, wherein the sensing value includes a voltage value across a shunt resistor, the shunt resistor being connected to a lead through which a DC current to the inverter flows.

5. The motor driver system of claim 1, wherein the sensing value is calculated from a DC current flowing through each phase of the inverter.

6. The motor driver system of claim 1, further comprising a noise elimination resistor connected between an output terminal of the excess current sensing device and a ground.

7. The motor driver system of claim 1, wherein a gain of the amplifier is in proportion to a ratio of the variable resistance value of the temperature variable resistor and a resistance value of the gain control resistor.

8. The motor driver system of claim 1, wherein the temperature variable resistor includes a thermistor.

9. The motor driver system of claim 1, wherein the temperature variable resistor is a Positive Temperature Coefficient (PTC) element having an increasing resistance value when the temperature rises, and the temperature variable resistor is connected to an output terminal of the amplifier and the gain control resistor so that the compensated sensing value rises when the temperature rises.

10. The motor driver system of claim 1, wherein the temperature variable resistor is a Negative Temperature Coefficient (NTC) element having a decreasing resistance value when the temperature rises, and the temperature variable resistor is connected to an input terminal of the amplifier and the gain control resistor so that the compensated sensing value rises when the temperature rises.

11. The motor driver system of claim 1, wherein the gain control resistor includes a variable resistor.

12. A motor driver system comprising:
an inverter configured to output an excess current sensing signal when a sensing value exceeds a preset excess value;
an amplifier configured to amplify a sensing value depending on a temperature of a motor, the sensing value being obtained from a current value input to the inverter, and outputs an amplified sensing value;
a controller configured to stop the motor when the amplified sensing signal is received;
a gain control resistor; and
a temperature variable resistor connected to an input terminal of the amplifier, the temperature variable resistor having a variable resistance varying with a temperature of the motor,
wherein a gain of the amplifier increases when the temperature of the motor increases.

13. The motor driver system of claim 12, wherein the gain of the amplifier is in direct proportion to the variable resistance of the temperature variable resistor.

14. The motor driver system of claim 13, wherein the gain of the amplifier is in direct proportion to a ratio of the variable resistance of the temperature variable resistor and a resistance value of the gain control resistor.

15. The motor driver system of claim 13, wherein the temperature variable resistor is a PTC (Positive Temperature Coefficient) element.

16. The motor driver system of claim 12, wherein the gain of the amplifier is in reverse proportion to the variable resistance of the temperature variable resistor.

17. The motor driver system of claim 16, wherein the gain of the amplifier is in reverse proportion to a ratio of the variable resistance of the temperature variable resistor and a resistance value of the gain control resistor.

18. The motor driver system of claim 16, wherein the temperature variable resistor is a NTC (Negative Temperature Coefficient) element.

19. A method for protecting a motor driver, comprising:
obtaining a sensing value from a current value associated with a motor;
compensating the sensing value according to a temperature of the motor to output the compensated sensing value; and
stopping the motor when the compensated sensing value exceeds a preset excess value,
wherein the compensating step further includes amplifying the sensing value according to the temperature of the motor and outputting the amplified sensing value as the compensated sensing value.

20. The method of claim 19, wherein the obtaining step includes obtaining the sensing value from the current value inputted into or outputted from either one of an inverter and the motor.

21. The method of claim 19, wherein the sensing value includes a voltage value across a shunt resistor, the shunt resistor being connected to a lead through which a DC current to the inverter flows.

22. The method of claim 19, further comprising:
outputting an excess current sensing signal when the compensated sensing value exceeds the preset excess value; and
stopping the motor when the excess current sensing signal is generated.

23. The method of claim 19, wherein the amplifying step includes amplifying the sensing value in direct proportion to the temperature rise of the motor.

24. The method of claim 19, further comprising the step of eliminating a noise current from the compensated sensing value.

* * * * *